Sept. 16, 1930.  J. H. PLATER  1,776,008

PISTON RING EXPANDER

Filed July 24, 1929

Inventor
James H. Plater
by Hazard and Miller
Attorneys

Patented Sept. 16, 1930

1,776,008

UNITED STATES PATENT OFFICE

JAMES H. PLATER, OF BURBANK, CALIFORNIA

PISTON-RING EXPANDER

Application filed July 24, 1929. Serial No. 380,625.

This invention relates to improvements in piston ring expanders.

An object of the invention is to provide an improved piston ring expander formed of a strip of resilient material, such as spring steel, and which is polygonal in form, adapted to be placed within a piston ring to expand the same.

The improved expander has for one of its novel features of construction crimps which define the sides of the polygonal strip. These crimps are novel in that they are non-parallel and are arranged in converging pairs, converging toward one side edge of the strip. By having the crimps so formed, the crimps form inclined edges which are slightly inclined toward the vertical central axis through the piston, to which the expander may be applied, so that when the expander presses outwardly against the inner side of the piston ring these inclined edges have the tendency of urging the ring toward one side of the piston ring groove. In this way the expander not only serves to expand the piston ring but tends to keep the piston ring urged tightly against one side of the ring groove, assisting in preventing leakage around the ring.

The improved piston ring expander is also advantageous in that it may be as easily and quickly constructed as expanders heretofore produced and will have the advantages present which are above mentioned.

Another object of the invention is to provide a piston ring expander adapted to be used in conjunction with an oil ring, which oil ring has apertures therethrough, and the expander is so constructed as to make provision for the flow of oil through the ring and by the expander through bleeding ports which may be formed in the piston.

With the foregoing and other objects in view, which will be made manifest in the following detailed description, and specifically pointed out in the appended claims, reference is had to the accompanying drawings for an illustrative embodiment of the invention, wherein:

Figure 1:
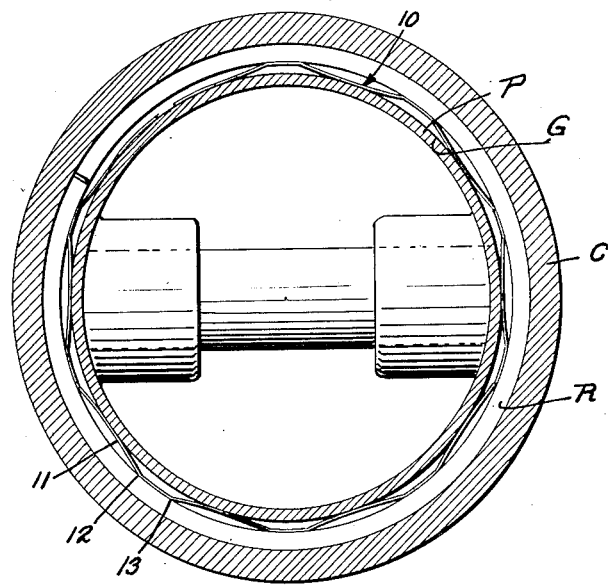
Fig. 1 is a horizontal section through a piston and cylinder illustrating the improved piston ring expander in applied position therein.

Referring to the accompanying drawings, wherein similar reference characters designate similar parts throughout, the reference character C designates a cylinder in which a piston P is reciprocable. The piston is shown as having one or more ring grooves G in which piston rings R are disposed, which may be of any conventional construction. The improved piston ring expander comprises a strip of resilient material, such as spring steel, which is polygonal in form and generally conforms to the shape of a circle. This strip of spring steel is indicated at 10, having a plurality of sides 11 which are defined from each other by crimps 12 and 13. The crimps 12 and 13 are arranged in pairs and are non-parallel. That is, the crimps 12 and 13 of each pair converge toward each other toward one side edge of the strip 10. By the improved construction when the expander is disposed within the ring groove G the outer surfaces of the crimps will present edges which are inclined slightly toward the longitudinal central axis through the piston P. Consequently by virtue of these inclined edges, the expander will serve not only to expand the ring R against the walls of the cylinder C, but it will also have the tendency to urge the ring R against the top of its ring groove. Whether the ring R is urged toward the top or bottom of its ring groove depends on whether the expander is right side up, as shown in Fig. 2, or in an inverted position.

Figure 2:
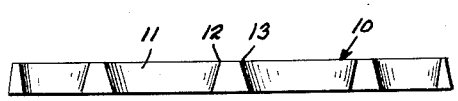
Fig. 2 is a view in side elevation of one form of piston ring expander.
Figure 3:
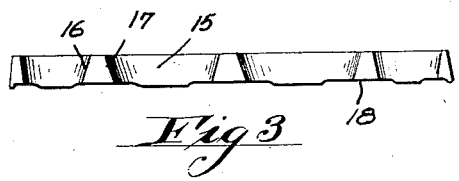
Fig. 3 is a view in side elevation of a piston ring expander which is designed to be used in conjunction with an oil ring.

The piston ring expander shown in Fig. 3 is of the same general construction as that shown in Figs. 1 and 2 and comprises a section or strip of spring steel 15 having converging pairs of crimps 16 and 17 defining the sides of the expander. This expander is designed to be used in conjunction with an oil ring through which passages may be formed, and to allow the flow of oil through the oil ring and through bleeding ports formed in the piston. Portions of one edge of the expander are removed, as indicated at 18. These removed portions are preferably arranged across ends of the crimps 16 and 17 and extend slightly therebeyond. They form passages at this edge of the expander through which oil, passing through the oil ring, can pass to reach the bleeding ports through the piston.

From the above described construction it will be appreciated that an improved piston ring expander is provided which is advantageous in that the expander serves not only to expand the ring R but urges it against one side of the ring groove and tends to keep it there. This has the effect of decreasing leakage around the rings. The improved expander also provides a construction which may be suitably and advantageously employed in conjunction with an oil ring.

The expander disclosed herein has an important advantage in that the formation of the crimps facilitates the insertion of the ring in the ring groove. While the improved expander can be used with any conventional form of ring, it has been designed to be used in conjunction with the ring disclosed in my copending application, Serial No. 380,624, filed July 24, 1929, wherein the ring has an interior annular bead or ridge at about its center in which the inclined edges at the crimps will bear and become effective in urging the ring against a side of the ring groove.

Various changes may be made in the details of construction without departing from the spirit or scope of the invention as defined by the appended claims.

I claim:

1. A piston ring expander comprising a strip of resilient material, polygonal in form, and having sides defined from each other by pairs of non-parallel crimps.

2. A piston ring expander comprising a strip of resilient material, polygonal in form, and having its sides defined from each other by pairs of converging crimps.

3. A piston ring expander comprising a strip of resilient material, polygonal in edge elevation, and having its sides defined from each other by pairs of converging crimps, all of the crimps of their respective pairs converging toward one edge of the strip.

4. A piston ring expander comprising a strip of resilient material adapted to be positioned in a piston ring groove within a piston ring, said expander presenting edges toward the piston ring which are slightly inclined toward the longitudinal central axis through the piston.

In testimony whereof I have signed my name to this specification.

JAMES H. PLATER.